June 13, 1972  J. E. PAPIN ET AL  3,669,506

CONTROL VALVE

Filed April 28, 1970

INVENTORS
JOSEPH E. PAPIN
STANLEY L. STOKES
BY
Joseph E. Papin 3,669,506
Patented June 13, 1972

3,669,506
CONTROL VALVE

Joseph E. Papin and Stanley L. Stokes, Florissant, Mo., assignors to Wagner Electric Corporation, Newark, N.J.
Filed Apr. 28, 1970, Ser. No. 32,611
Int. Cl. B60t 17/22, 8/26
U.S. Cl. 303—6 C 13 Claims

ABSTRACT OF THE DISCLOSURE

A control valve for use in a dual hydraulic brake system having a switch actuating piston movable to opposed translatory positions to energize a driver warning circuit upon the failure of one of the dual systems. A proportioning valve is also provided and is operable generally in response to supplied fluid pressure of one of the systems to effect a proportionally reduced application thereof through the control valve. The proportioning valve has one end thereof slidable in an end of the switch actuating piston, and upon the translatory movement of said switch actuating piston to one of its translated positions, an additional area on said proportioning valve is exposed to the supplied fluid pressure which thereafter effects a different proportionally reduced applied fluid pressure.

---

Figure 1:
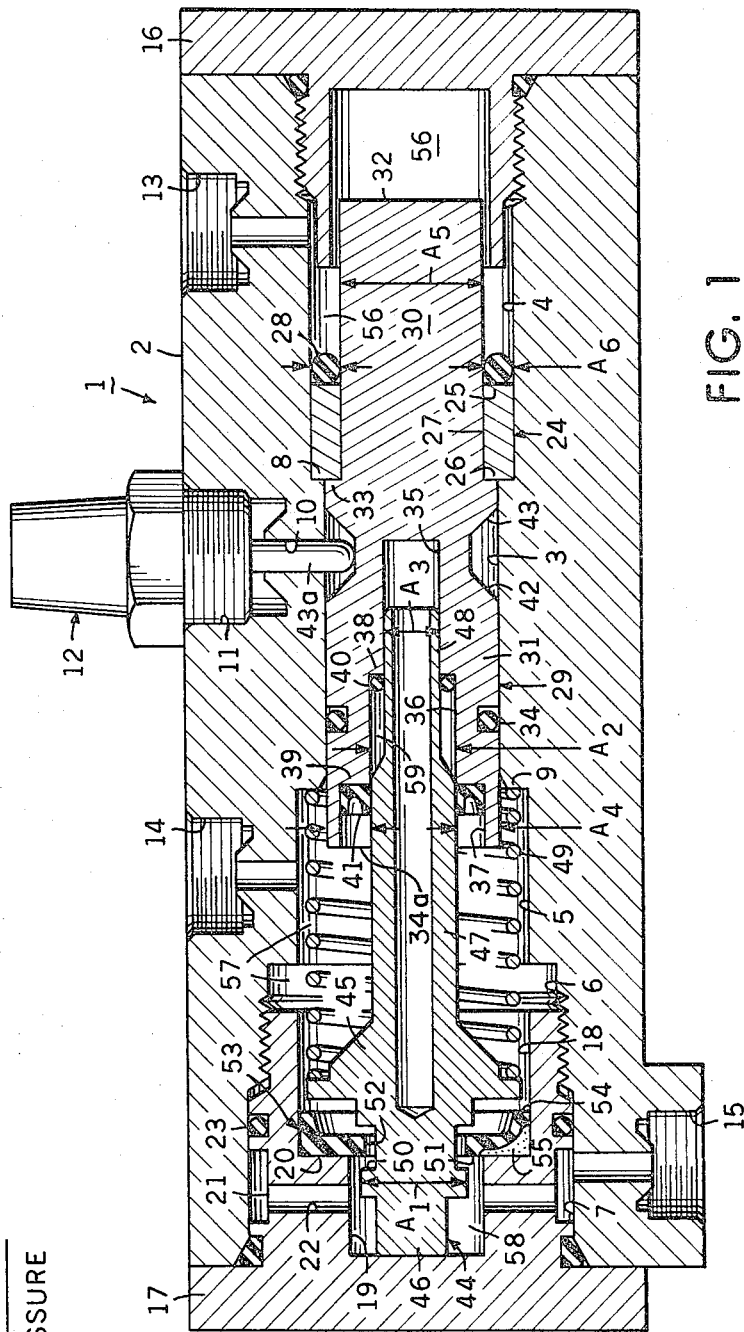

This invention relates generally to dual hydraulic braking systems and in particular to a control valve therefor.

SUMMARY OF THE INVENTION

In the past, dual hydraulic braking systems have been provided with a control valve device having a switch actuating piston movable therein to energize an electrical driver warning circuit in response to a fluid pressure failure in one or the other dual systems and also a proportioning or modulating valve movable in response to fluid pressure in one of said systems supplied thereto to effect a proportionally reduced applied fluid pressure to the brake of the one system. Further, in some of the past control valves, the switch actuating piston and proportioning valve have been interrelated wherein one end of the proportioning valve was slidably received in an end portion of the switch actuating piston. Also, the prior are control valves and systems provided a by-pass around the proportioning valve in order to obviate the proportioning effect thereof on the applied fluid pressure to the rear brakes upon a failure of the front brakes in order to utilize the maximum available fluid pressure for bringing the vehicle to a stop. One of the disadvantageous or undesirable features of such past control valves was that the proportioning valve was either permitted to continue its proportioning function, or else by-passed to obviate its proportioning function, upon a failure of the fluid pressure to the front brakes; however, in certain brake system designs, it would be more desirable to increase the pressure at which the proportioning valve begins its proportioning function and alter the ratio between the fluid pressure supplied to the proportioning valve and the applied fluid pressure effected thereby in the event of a fluid pressure failure in the front brake system.

The principal object of the present invention is to provide a control valve for a dual hydraulic brake system which overcomes the disadvantageous and undesirable features of such past control valves, and this, as well as other objects and advantageous features of the present invention, will be disclosed hereinafter.

Briefly, the present invention embodies a control valve having means movable therein toward opposed translated positions in response to preselected pressure conditions of separate fluid pressures supplied thereto, modulating means generally operable for performing a fluid modulating operation on one of the supplied fluid pressures and movable in said first named means, said modulating means including means for selective subjection to the one supplied fluid pressure to alter the fluid modulating operation of said modulating means upon the movement of said first named means to one of its translated positions.

RELATED PATENTS

This patent application is related to U.S. Pat. No. 3,464,741 issued to Edward J. Falk on Sept. 2, 1969, and to the Stanley L. Stokes U.S. patent application Ser. No. 8,480 filed Feb. 4, 1970, each being assigned to the common assignee of this patent application which is a patentably distinct improvement thereof.

DRAWING DESCRIPTION

Figure 2:
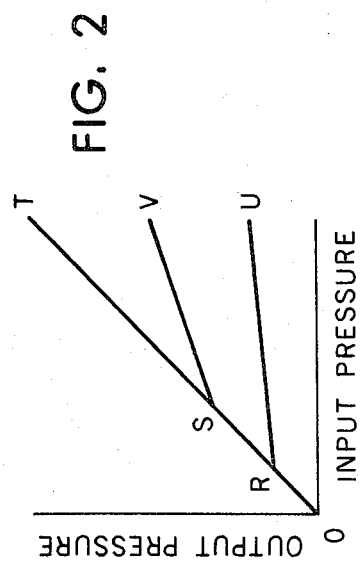

FIG. 1 is a sectional view showing a control valve embodying the present invention in cross-section, and FIG. 2 is a graphical representation of the input and output fluid pressures of the control valve of FIG. 1.

Referring now to the drawings and in particular to FIG. 1, a control valve 1 is provided with a housing 2 having a bore 3 therein axially interposed between a counterbore 4 and aligned stepped counterbores 5, 6 and 7, and shoulders 8, 9 are provided on said housing between the bore and counterbore 3, 4 and between the bore and counterbore 3, 5, respectively. A cross bore 10 is provided in the housing 2 having one end intersecting with the housing bore 3 and the other end thereof intersecting with a cross counterbore 11 which is threaded to receive an electrical switch, indicated generally at 12, for connection in an electrical driver warning circuit (not shown) as well known in the art. Inlet ports 13, 14, which are adapted for connection with the separate fluid pressure supplies of a well known dual or tandem master cylinder (not shown), are provided in the housing 2 intersecting with the housing counterbores 4, 5, respectively, and an outlet port 15, which is adapted for connection with the vehicle rear brakes (not shown), is also provided in said housing 2 intersecting with the housing counterbore 7. Closure members or end caps 16, 17 are threadedly received in the housing counterbores 4, 6, respectively, and stepped bores 18, 19 having a shoulder 20 therebetween are provided in the end cap 17. A peripheral groove 21 is provided in the closure member 17 in open pressure fluid communication at all times with the outlet port 15, and a connecting passage 22 is provided in said closure member between said peripheral groove and the smaller stepped bore 19. A peripheral seal 23 is carried in the closure member 17 in sealing engagement with the housing counterbore 7 and interposed between the closure member peripheral groove 21 and the housing counterbore 6.

A centering member, such as the piston indicated generally at 24, is slidably received in the housing counterbore 4 having opposed ends 25, 26, and an axial bore 27 is provided through said centering piston intersecting with the ends 25, 26 thereof, respectively. The centering piston end 26 is normally engaged with the housing shoulder 8, and a seal, such as the O-ring 28, is normally positioned in sealing engagement between the centering piston end 25 and the housing counterbore 4 about the centering piston bore 27.

A translatory indicator or switch actuating member, such as the piston indicated generally at 29, is slidably received in the housing bore 3 and provided with opposed extensions 30, 31. The piston extension 30 is slidably received in the centering piston bore 27 and extends coaxially through the seal 28 in sealing engagement therewith having a free end portion 32 in the housing counterbore 4 for abutment with the interior end of the closure member 16, and a shoulder or abutment 33 is provided on said switch actuating piston normally in abutting engagement with the centering piston end 26. A peripheral seal 34 is carried on the piston extension 31 in sealing engagement with the housing bore 3, and a free end portion 34a is provided on said piston extension extending coaxially into the housing counterbore 5. Stepped bores 35, 36, 37 are axially provided in the switch piston 29 intersecting with the free end 34a thereof, and shoulders 38, 39 are provided on said switch piston between the smaller and intermediate stepped bores 36, 37 and between the intermediate and larger stepped bores 36, 37, respectively. A seal or O-ring 40 is positioned in engagement with the switch piston shoulder 38 in sealing engagement with the intermediate stepped bore 36 about the smaller stepped bore 35, and another seal, such as the annular cup member 41, is positioned in engagement with the switch piston shoulder 39 in sealing engagement with the larger stepped bore 37 about the intermediate stepped bore 36. Peripheral opposed cam surfaces 42, 43 are provided in the switch piston 29 for camming or driving engagement with an operating member 43a of the electrical switch 12 which is movable from its normal circuit interrupting position to a circuit making position, as discussed hereinafter.

A modulating or proportioning member, such as the piston indicated generally at 44, is provided with a hexagonally shaped head portion 45 slidably and guidably received in the larger stepped bore 18 of the closure member 17 and integrally interposed between a stop member or extension 46 and reduced stepped extensions 47, 48, and a modulating or proportioning spring 49 is pre-compressed between the housing shoulder 9 and said head portion to normally urge said proportioning piston toward its normal or inoperative position engaging said stop member with the end wall of the smaller stepped bore 19 of said closure member. An annular valve member 50 is provided on the proportioning piston head portion 45 for sealing engagement with a valve seat 51 provided about an aperture 52 in a seating member 53, said aperture being radially spaced from said stop member. The seating seating member 53 is positioned in abutting engagement with the closure member shoulder 20, and an annular lip portion 54 is provided on said seating member normally in sealing engagement with the closure member larger stepped bore 18 to close a plurality of return flow passages 55 provided across said seating member. The stepped extensions 47, 48 of the proportioning piston 44 are slidably received in the intermediate and smaller stepped bores 36, 35 of the switch piston 29 extending coaxially through seals 41, 40 in sealing engagement therewith, respectively.

An inlet chamber 56 is defined in the housing counterbore 4 between the closure member 16 and the centering and switch pistons 24, 29 in open pressure fluid communication with the inlet port 13, and another inlet chamber 57 is defined in the housing counterbores 5, 6 and the larger stepped bore 18 of the closure member 17 between the seating member 53 and the switch piston 29 in open pressure fluid communication with the inlet port 14. The smaller stepped bore 19, the connecting passage 22, and the peripheral groove of the closure member 17 define an outlet chamber 58 in open pressure fluid communication with the outlet port 15 and connected through the seating member aperture 52 with the inlet chamber 57. A change-over chamber 59 is defined in the intermediate stepped bore 36 of the switch piston 29 between the seals 40, 41 for selective connection in pressure fluid communication with the inlet chamber 57, as discussed hereinafter.

It should be noted that the proportioning piston 44 is provided with an effective area $A_1$ thereon defined substantially by the sealing engagement of the valve member 50 with the valve seat 51 for subjection to the fluid pressure at the outlet port 15, and the sealing engagements of the proportioning piston stepped extensions 47, 48 with the seals 41, 40 define effective areas $A_2$, $A_3$ on said proportioning piston for subjection to the fluid pressure at the inlet port 14 and the atmosphere, respectively, said areas $A_2$, $A_3$ being opposed to the area $A_1$. The switch piston 29 is also provided with opposed effective areas $A_4$, $A_5$ respectively subjected to the fluid pressures at the inlet ports 14, 13, said area $A_4$ being defined substantially between the sealing engagement of the seals 34, 41 with the housing bore 3 and proportioning piston extension 46 and said area $A_5$ being defined by the sealing engagement of the piston extension 30 with the seal 28. The centering piston 24 is provided with an effective area $A_6$ additive to the switch piston area $A_5$ and subjected to the fluid pressure at the inlet port 13, said area $A_6$ being substantially defined by the sealing engagement of the seal 28 between the housing counterbore 4 and the switch piston extension 30. To complete the description of the control valve 1, it should be noted that the area $A_4$ is equal to or greater than the opposing area $A_5$ in the switch piston 29, and the additive areas $A_5$, $A_6$ of the centering and switch pistons 24, 29 are greater than the switch piston area $A_4$.

In the operation with the component parts of the control valve 1 in their normal or inoperative positions, as shown in the drawing and as described hereinbefore, operator actuation of the split system master cylinder (not shown) establishes separate and substantially equal supplied or input fluid pressures $P_1$, $P_2$ at the inlet ports 13, 14. The input fluid pressure $P_1$ flows from the inlet port 13 into the inlet chamber 56 acting on the centering piston area $A_6$ to establish a force $P_1A_6$ urging the centering piston 24 and seal 28 leftwardly to engage the leftward end 26 of said centering piston in abutment with the housing shoulder 8 and the switch piston shoulder 33, and the input fluid pressure $P_1$ also acts on the area $A_5$ of the switch piston 29 to establish a leftwardly directed force $P_1A_5$. The input fluid pressure $P_2$ flows from the inlet port 14 into the inlet chamber 57 through the aperture 52 of the seating member 53 and the outlet chamber 58 to establish an output or applied fluid pressure $P_o$ of substantially the same magnitude at the outlet port 15, and the input fluid pressure $P_2$ in the inlet chamber 57 acts on the effective area $A_4$ of the switch piston 29 to establish a force $P_2A_4$ in opposition to the force $P_1A_5$. Since the sum of the area $A_5$, $A_6$ is greater than the area $A_4$, as mentioned hereinbefore, it is apparent that the additive forces $P_1A_5$, $P_1A_6$ are greater than the opposing force $P_2A_4$ to normally obviate a rightward translatory movement of the switch piston 29 from its normal or centered position, as shown. Further, since the force $P_1A_6$ urges the centering piston 24 into engagement with the housing shoulder 8, it is also apparent that the force $P_2A_4$ is greater than the force $P_1A_5$ to normally oppose leftward translatory movement of the switch piston 29 from its centered position since the area $A_4$ is greater than the area $A_5$.

The input fluid pressure $P_2$ acts on the effective area $A_2$ of the proportioning piston 44 to establish a closing force $P_2A_2$ urging said proportioning piston against the compressive force $F_c$ of the metering spring 49; however, the metering spring force $F_c$ prevents movement of said metering piston until the input and output fluid pressures $P_2$, $P_o$ exceed a predetermined value, as shown by the point R on the line OT in the graphical representation of FIG. 2. When the predetermined value R of the input and output fluid pressures $P_2$, $P_o$ is attained, the closing force $P_2A_2$ overcomes the metering spring force $F_c$ to move the proportioning piston 44 from its inoperative position in a rightward direction toward an isolating position. The movement of the proportioning piston 44 to its isolating position engages the valve member 50 with the seating member valve seat 51 closing the seating member aperture 52 to isolate the input fluid pressure $P_2$ in the inlet chamber 57 from the output fluid pressure $P_o$ in the outlet chamber 58, and upon the engagement of said valve member with said valve seat, the input fluid pressure $P_2$ acts on an effective input area $A_1-A_2$ of said proportioning piston to establish an input force $$P_2(A_1-A_2)$$

which is additive to the spring force $F_c$ to substantially balance the opposed output force $P_oA_1$ established by the output fluid pressure $P_o$ acting on the effective output area $A_1$ on said proportioning piston.

From the graphical representation in FIG. 2, it is obvious that increases in the magnitudes in the input fluid pressures $P_1$, $P_2$ in excess of the predetermined value R, as shown on the line OT, will result in proportionally reduced increases in the output fluid pressure $P_o$, as shown by the line RU. For instance, when the input fluid pressures $P_1$, $P_2$ are increased to a value in excess of the predetermined value R, the input force $P_2(A_1-A_2)$ is correspondingly increased and additive to the metering spring force $F_c$ to overcome the output force $P_oA_1$; therefore, the metering piston 44 is moved in a leftward direction to a metering position disengaging the valve member 50 thereof from the seating member valve seat 51 to effect a metered application of the increased input fluid pressure $P_2$ through the seating member aperture 52 and the outlet chamber 58 to the outlet port 15 to effect a proportional increase of the output fluid pressure $P_o$ in a predetermined ratio with the input fluid pressure $P_2$ at the inlet port 14, as shown by the line RU in the graph of FIG. 3 wherein $$P_o = \frac{P_2(A_1-A_2)+F_c}{A_1}$$

Of course, the increased output fluid pressure $P_o$ effects a corresponding increase in the output force $P_oA_1$, and when the increased output force $P_oA_1$ attains an increased value substantially equal to that of the increased input force $P_2(A_1-A_2)$ and the additive metering spring force $F_c$, the proportioning piston 44 is again moved rightwardly toward its isolating position to re-engage the valve member 50 thereof with the seating member valve seat 51 and again isolate the increased input and output fluid pressures $P_2$, $P_o$ at the inlet and outlet ports 14, 15 respectively. It is, of course, obvious that the proportioning piston 44 will be further responsive to further increases in the input fluid pressure $P_2$ to effect further corresponding proportional increases in the output fluid pressure $P_o$ in the same manner as previously described, and since the input fluid pressures $P_1$, $P_2$ are substantially equal, the force balance of the forces $P_1A_6$, $P_1A_5$ and $P_2A_4$ acting on the centering and switch pistons 24, 27 remain substantially the same obviating displacement or translatory movement of said switch piston from its normally centered position. When the split master cylinder is de-actuated, the input fluid pressures $P_1$, $P_2$ are vented to the atmosphere which eliminates the forces $P_1A_5$, $P_1A_6$, and $P_2A_4$ acting on the centering piston 24 and the switch piston 29 along with the input force $P_2(A_1-A_2)$ acting on the proportioning piston 44. Upon the elimination of the input force $P_2(A_1-A_2)$, the output fluid pressure $P_o$ acting on the seating member 53 displaces the lip 54 thereof from sealing engagement with the closure member larger stepped bore 18, and in this manner, the output fluid pressure $P_o$ returns from the outlet port 15 through the outlet chamber 58 and past the displaced seating member lip 54 through the return flow passage 55 into the inlet chamber 57 to the inlet port 14. When the outlet fluid pressure $P_o$ is so reduced to correspondingly reduce the output force $P_oA_1$ to a value less than the metering spring force $F_c$, the metering spring 49 moves the proportioning piston 44 leftwardly toward its original position re-engaging the stop 46 with the closure member 17 and displacing the valve member 50 from the seating member valve seat 51 to again open the seating member aperture 52 re-establishing open pressure fluid communication therethrough between the inlet and outlet ports 14, 15 to effect complete elimination of the output fluid pressure $P_o$.

In the event of the failure of the input fluid pressure $P_1$ due to a malfunction of the split system master cylinder or other leaks or the like, it is, of course, desirable to maintain the metering or proportioning function of the proportioning piston 44 under such emergency conditions; however, it is also desirable to effect a change in the ratio between the input and output fluid pressure $P_2$, $P_o$, as discussed hereinafter. When the magnitude of the input fluid pressure $P_2$ exceeds that of the failed input fluid pressure $P_1$ by a predetermined value, the force $P_2A_4$ acting on the switch piston 29 concertedly displaces the switch and centering pistons 29, 24 in a rightward direction toward a rightward displaced or translated position engaging the free end 32 of the switch piston extension 30 with the closure member 16. The rightward movement of the switch piston 29 to its rightward translated position disengages the sealing cup 41 from sealing engagement with the proportioning piston stepped extension 47 and connects the change-over chamber 59 in open pressure fluid communication with the inlet port 14, and in this manner, the effective area $A_2-A_3$ on the proportioning piston 44 is selectively subjected to the input fluid pressure $P_2$. When the input and output fluid pressures $P_1$, $P_o$ attain a predetermined value S on the line OT in the graph of FIG. 2, the input fluid pressure $P_2$ now acts on the effective area $A_3$ of the proportioning piston 44 to establish the closing force $P_2A_3$ urging said proportioning piston rightwardly toward its isolating positon to sealably engage the proportioning piston valve member 50 with the seating member valve seat 51 closing the seating member aperture 52 and isolating the input and output fluid pressures $P_2$, $P_o$ at the inlet and output ports 14, 15, respectively. Of course, since the effective area $A_3$ is less than the area $A_2$, the predetermined value S or knee point of the curve OSV in the graph of FIG. 3 is greater than the predetermined value R, and the slope of the line SV will be greater than that of the line RU in the graph of FIG. 3. With the proportioning piston 44 in its isolating position, the closing force $P_2A_3$ is replaced by the input force $P_2(A_1-A_3)$ of the input fluid pressure $P_2$ acting on the input effective area $A_1-A_3$ which is additive to the metering spring force $F_c$, and the input force $P_2(A_1-A_3)$ and the additive metering spring force $F_c$ is substantially equal to and balanced by the output force $P_oP_1$ of the output fluid pressure $P_o$ acting on the output effective area $A_1$.

From the graphical representation in FIG. 2, it is obvious that increases in the magnitude of the input fluid pressure $P_2$ in excess of the predetermined value S, as shown on the line ST, will result in proportionally reduced increases in the output fluid pressure $P_o$, as shown by the line SV. When the input fluid pressure $P_2$ is increased to a value in excess of the predetermined value S, the input force $P_2(A_1-A_3)$ is correspondingly increased and additive to the metering spring force $F_c$ to overcome the output force $P_oA_1$; therefore, the proportioning piston 44 is moved to its metering position disengaging the valve member 50 thereof from the seating member valve seat 51 to effect the metered application of the input fluid pressure $P_2$ through the seating member aperture 52 and the outlet chamber 58 to the outlet port 15 to effect the proportional increase in the output fluid pressure $P_o$ in another predetermined ratio with the increased input fluid pressure $P_2$ at the inlet port 14, as shown by the line SV in the graph of FIG. 2 wherein $$P_o = \frac{P_2(A_1-A_3)+F_c}{A_1}$$

Of course, the increased output fluid pressure $P_o$ effects a corresponding increase in the output force $P_oA_1$, and when the increased output force $P_oA_1$ attains a value substantially equal to the input force $P_2(A_1-A_3)$ of the additive spring force $F_c$, the proportioning piston 44 is again moved to its isolating position. The proportioning piston 44 will be responsive to further increases in the input fluid pressure $P_2$ to effect further proportional increases in the output fluid pressure $P_o$ in the same manner as previously described when the input fluid pressure $P_1$ has failed. Of course, when the split master cylinder is deactuated to vent the input fluid pressure $P_2$ to the atmosphere, the input force $P_2(A_1-A_3)$ is eliminated and the output fluid pressure $P_o$ displaces the seating member lip 54 from sealing engagement with the closure member stepped bore 18 to open the seating member return flow passages 55 permitting the return flow therethrough of the output fluid pressure $P_o$ to the inlet port, as previously mentioned. Upon the reduction of the output force $P_oA_1$ to a value less than the metering spring force $F_c$, the metering spring 49 moves the proportioning piston 44 leftwardly to its original position again effecting open pressure fluid communication between the inlet and outlet ports 14, 15 through the seating member aperture 52.

In the event of a similar failure of the other input fluid pressure $P_2$, the input fluid pressure $P_1$ in the inlet chamber 56 acts on the effective area $A_5$ of the switch piston 29 establishing the force $P_1A_5$ which is effective to translate said switch piston leftwardly toward its leftward translated or displaced position wherein the end wall of the smaller stepped bore 35 in said switch piston is moved into abutting engagement with the free end of the proportioning piston reduced extension 48. Of course, the translatory movement of the switch piston 29 to its opposed rightward and leftward translated positions drivingly engages the switch piston camming surfaces 42, 43 with the operating member 43a of the electrical switch 12 to effect upward movement thereof from its normal or inoperative circuit interrupting position toward its operative or circuit completing position to effect energization of the circuit (not shown) connected therewith and light the driver warning dash lamp (not shown) in order to alert the vehicle operator of the brake system failure.

From the foregoing, it is now apparent that a novel control valve 1 is disclosed and that changes and modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, means movable in said housing from a normally centered position toward opposed translated positions in response to preselected pressure conditions of separate fluid pressures supplied thereto, modulating means movable in said housing and actuated in response to one of the supplied fluid pressures in excess of a predetermined value for performing a fluid modulating operation thereon when said first named means is in its centered and one of its translated positions, and said modulating means including means movable in said first named means and defining an area isolated from and subjected to the one supplied fluid pressure when said first named means is in its centered and one translated positions, respectively, the predetermined value of the one supplied fluid pressure at which the modulating operation of said modulating means occurs when said first named means is in its centered position and said area is isolated from the one supplied fluid pressure being predeterminately greater than the predetermined value of the one supplied fluid pressure when said area is subjected to the one supplied fluid pressure upon the movement of said first named means to its one translated position in the event of the failure of the other of the supplied fluid pressures.

2. A control valve comprising a housing, means for comparing the magnitudes of separate fluid pressures supplied to said housing and movable therein from a normally centered position toward opposed translated positions in response to oppositely acting differentials in excess of a predetermined amount between the magnitudes of the supplied fluid pressures acting thereon, proportioning means movable in said housing for performing proportioning operations on one of the supplied fluid pressures when said first named means is in its centered position and one of its translated positions, respectively, said proportioning means being operable generally in response to the one supplied fluid pressure in excess of a predetermined value to effect a proportional application thereof through said housing, and said proportioning means including means movable in said first named means and defining therewith a chamber isolated from and subjected to the one supplied fluid pressure when said first named means is in its centered and one translated positions, respectively, and an area on said included means subjected to fluid pressure in said chamber, the predetermined value of the one supplied fluid pressure at which the proportioning operation of said proportioning means occurs when said area is isolated from the one supplied fluid pressure being predeterminately less than the predetermined value of the one supplied fluid pressure at which the proportioning operation of said proportioning means occurs when said area is subjected to the one supplied fluid pressure upon the movement of said first named means to its one translated position connecting said chamber in pressure fluid communication with the one supplied fluid pressure.

3. A control valve according to claim 2, wherein said included means comprises an extension integral with said proportioning means and slidable in said first named means to define therewith said chamber, said area being on said extension and within said chamber when isolated from the one supplied fluid pressure.

4. A control valve according to claim 3, wherein said chamber includes a bore in said first named means, said extension being slidable in said bore, and seal means engaged between said extension and said first named means isolating said area from the one supplied fluid pressure when said first named means is in its centered position, said seal means being disengaged from one of said first named means and said extension upon the movement of said first named means to its one translated position to connect said chamber in pressure fluid communication with the one supplied fluid pressure and subject said area thereto.

5. A control valve according to claim 2, comprising a pair of stepped bores in said first named means, the larger of said stepped bores defining said chamber, said included means including a pair of stepped extensions integral with said proportioning means and slidable in said stepped bores, respectively, and a shoulder on said proportioning means between said stepped extension defining said area, and seal means engaged between said first named means and the larger of said stepped extensions normally isolating the larger of said stepped bores and said area from the one supplied fluid pressure when said first named means is in its centered position, said seal means being disengaged from one of said first named means and said proportioning means to subject said larger stepped bore and said area to the one supplied fluid pressure upon the movement of said first named means to its one translated position.

6. A control valve comprising a housing having a pair of inlet ports and an outlet port therein, a switch actuating piston movable in said housing between said inlet ports from a normal operating position toward opposed translated positions in the event of the failure of fluid pressure at one of said ports, a proportioning member movable in said housing for performing fluid pressure proportioning operations between said outlet port and the other of said inlet ports, said proportioning member being operable generally in response to the fluid pressure at said other inlet port in excess of a predetermined value to thereafter effect a proportionally reduced fluid pressure at said outlet port, said proportioning member including extension means movable in said switch actuating piston and defining therewith a chamber respectively isolated from and subjected to the fluid pressure at said other inlet port when said switch actuating piston is in its normal operating position and one of its translated positions, and an area on said extension means and subjected to the fluid pressure in said chamber, the predetermined value of the fluid pressure at said other inlet port at which the proportioning operation of said proportioning member occurs when said area and chamber are subjected to the fluid pressure at said other inlet port being predeterminately in excess of the predetermined value at which the proportioning operation of said proportioning member occurs when said area and chamber are subjected to the fluid pressure at said other inlet port.

7. A control valve according to claim 6, comprising first and second end portions on said switch actuating piston respectively subjected to the fluid pressures at said one and other inlet ports, said chamber including a bore in said switch actuating piston intersecting with said second end portion, said extension means being slidable in said bore, and a seal engaged between said switch actuating member and said extension means isolating said bore and said area from the fluid pressure at said other inlet port when said switch actuating means is in its normal operating position, said seal being disengaged from one of said switch actuating piston and said extension means upon the movement of said switch actuating piston to its one translated position to subject said bore and said area to the fluid pressure at said other inlet port.

8. A control valve according to claim 6, comprising a pair of stepped bores in said switch actuating piston, said extension means including a pair of stepped portions respectively slidable in said stepped bores, a shoulder on said extension means between said stepped portions defining said area, and a pair of sealing means respectively engaged between said switch actuating piston and said stepped portions, said chamber being defined in the larger of said stepped bores between said sealing means, one of said sealing means being disengaged from one of said switch actuating pistons and one of said stepped portions to subject said chamber and area to the fluid pressure at said other inlet port upon the movement of said switch actuating piston to its one translated position when the fluid pressue at said one inlet port fails.

9. A control valve comprising a housing, means for comparing the magnitudes of separate fluid pressures supplied to said housing and movable therein from a normally centered position toward opposed translated positions in response to oppositely acting differentials in excess of a predetermined amount between the magnitudes of the supplied fluid pressures acting thereon, proportioning means movable in said housing and actuated in response to one of the supplied fluid pressures in excess of a predetermined value to effect a proportioning application thereof through said housing, a pair of stepped bores in said first named means, a pair of stepped extensions on said proportioning means and slidable in said stepped bores, respectively, a shoulder on said proportioning means between said stepped extensions defining an area for subjection to the one supplied fluid pressure when said first named means is in one of its translated positions and normally isolated from the one supplied fluid pressure when said first named means is in its centered position, said proportioning means being actuated in response to another predetermined value of the one supplied fluid pressure predeterminately in excess of the first named predetermined value when said area is subjected to the one supplied fluid pressure upon the movement of said first named means to its one translated position in response to the failure of the other of the supplied fluid pressures, and seal means engaged between said first named means and the larger of said stepped extensions normally isolating the larger of said stepped bores and said area from the one supplied fluid pressure when said first named means is in its normal position, said seal means being disengaged from one of said first named means and said larger stepped extension to subject said larger stepped bore and said area to the one supplied fluid pressure upon the movement of said first named means to its one translated position.

10. A control valve comprising a housing having a pair of inlet chambers and an outlet chamber therein, means movable in said housing between said inlet chambers from a normally centered position toward opposed translated positions in response to preselected fluid pressure conditions in said inlet chembers, proportioning means movable in said housing between one of said inlet chambers and said outlet chamber for performing fluid pressure proportioning operations, said proportioning means being operable generally in response to fluid pressure in said one inlet chamber and said outlet chamber in excess of a predetermined value to effect a proportioning application of fluid pressure therebetween, other means on said proportioning means movable in said first named means and defining therewith another chamber respectively connected with and isolated from the fluid pressure in said one chamber when said first named means is in its centered position and one of its translated positions, and an area on said other means and subjected to fluid pressure in said other chamber, the predetermined value at which the proportioning operation of said proportioning means occurs when said area is subjected to the fluid pressure in said one inlet chamber being predeterminately greater than that at which the proportioning operation of said proportioning means occurs when said area is isolated from the fluid pressure in said one inlet chamber.

11. A control valve according to claim 10, comprising seal means engaged between said first named and other means and isolating said other chamber from the fluid pressure in said one inlet chamber when said first named means is in its centered position, said seal means being disengaged from one of said first named and other means upon the movement of said first named means to its one translated position to subject said other chamber and area to the fluid pressure in said one inlet chamber.

12. A control valve according to claim 11, comprising a pair of stepped bores in said first named means, said other means being slidable in at least one of said stepped bores and defining therewith said other chamber.

13. A control valve according to claim 10, comprising a pair of stepped bores in said first named means, said other means including a pair of stepped portions respectively slidable in said stepped bores, a shoulder on said other means between said stepped portions defining said other means being slidable in at least one of said stepped between said first named means and said stepped portions, said chamber being defined in one of said stepped bores between said seal means, and one of said seal means being disengaged from one of said first named means and one of said stepped portions to subject said chamber and said area to the fluid pressure in said one inlet chamber upon the movement of said first named means to its one translated position.

References Cited
UNITED STATES PATENTS 3,467,440   9/1969   Strien _____ 303—6 C
3,464,741   9/1969   Falk _____ 303—6 C MILTON BUCHLER, Primary Examiner J. J. McLAUGHLIN, Assistant Examiner U.S. Cl. X.R.

137—87, 493.9, 495; 188—349; 200—82 D; 303—84 A; 340—52 C

UNITED STATES PATENT OFFICE

CERTIFICATE OF CORRECTION

Patent No. 3,669,506            Issued June 13, 1972

Joseph E. Papin Et al

It is certified that error appears in the above-identified patent and that said Letters Patent are hereby corrected as shown below:

Column 1, line 45, "are" should read -- art --. Column 3, line 40, delete -- seating --, first occurrence. Column 6, line 30, "output" should read -- outlet --; line 42, "Po $P_1$" should read -- Po $A_1$ --. Column 7, line 6, "passages" should read -- passage --. Column 10, line 52, delete entire line and insert -- area, a pair of spaced seal means respectively engaged --.

Signed and sealed this 9th day of January 1973.

(SEAL)
Attest:

EDWARD M. FLETCHER, JR.            ROBERT GOTTSCHALK
Attesting Officer                  Commissioner of Patents